United States Patent [19]

Reuvekamp

[11] 4,287,393
[45] Sep. 1, 1981

[54] TRANSMISSION BRIDGE FOR A SUBSCRIBER'S CIRCUIT

[75] Inventor: Antonius H. J. Reuvekamp, Blantyre, Malawi

[73] Assignee: U.S. Philips Corporation, New York, N.Y.

[21] Appl. No.: 77,470

[22] Filed: Sep. 20, 1979

[30] Foreign Application Priority Data

Oct. 6, 1978 [NL] Netherlands .................. 7810086

[51] Int. Cl.$^3$ ...................... H04M 19/08; H04M 3/18
[52] U.S. Cl. ...................................... 179/70; 179/77
[58] Field of Search .............. 179/16 AA, 18 FA, 70, 179/77, 170 R, 170 NC, 16 F, 16 A

[56] References Cited

U.S. PATENT DOCUMENTS

| 4,007,335 | 2/1977 | Hetherington et al. | 179/16 AA |
| 4,041,252 | 8/1977 | Cowden | 179/170 NC |
| 4,088,843 | 5/1978 | Rogers et al. | 179/70 |

Primary Examiner—James W. Moffitt
Assistant Examiner—Randall P. Myers
Attorney, Agent, or Firm—Thomas A. Briody; William J. Streeter; Laurence A. Wright

[57] ABSTRACT

A transmission bridge comprising two alternating current circuits having a non-inverting signal input, an inverting signal input and a signal output, the non-inverting signal inputs being coupled to associated connecting terminals for the connection of a subscriber's line, the inverting signal inputs being connected to those terminals to which the non-inverting signal inputs of the other alternating current circuits are coupled, the outputs being coupled to the connecting terminals via supply resistors for preventing the anti-phase signals such as speech signals, present at the terminals, from being attenuated and for attenuating by means of the supply resistors in-phase signals, such as noise signals induced in the subscriber's line, present at the terminals.

8 Claims, 5 Drawing Figures

TRANSMISSION BRIDGE FOR A SUBSCRIBER'S CIRCUIT

This invention relates to a transmission bridge for a subscriber's circuit. More particularly, the invention relates to a transmission bridge for a subscriber's circuit having means to provide polarity independence and means to substantially reduce attenuation of the differential mode signals.

BACKGROUND OF THE INVENTION

The invention teaches a transmission bridge for a subscriber's circuit comprising a supply source, supply resistors and terminals for the connection of a subscriber's line, the supply source being coupled, in a polarity independent manner, to the connecting terminals via the supply resistors.

Such a transmission bridge comprising a transformer having two primary windings, arranged in series by means of a capacitor, and at least one secondary winding, the supply source being connected to the connecting terminals via a polarity-reversing switch the supply resistors and the primary windings are generally known.

This known transmission bridge has the property that a.c. voltage signals, so-called differential mode signals such as speech and ringing signals, occurring in antiphase at the connecting terminals, are transferred from the primary to the secondary side and vice versa by means of the transformer and that in-phase a.c. voltage signals, so-called common mode signals, such as unwanted signals induced by a noise source in the two wires of the subscriber's line, occurring on the connecting terminals are blocked by the transformer and attenuated by the supply resistors.

In addition, this known transmission bridge is of a symmetrical structure so that common mode signals are prevented from being converted into differential mode signals and vice versa. Because of the transformer such a transmission bridge is rather bulky. Furthermore, a portion of the differential mode signals is applied across the capacitor connected between the primary windings and, consequently, across the supply resistors, causing these signals to be attenuated.

It is an object of the invention to realize a transmission bridge described in the preamble, which, while retaining said advantages such as the polarity independance can be implemented wholly electronically and wherein substantially no attenuation of the differential mode signals by the supply resistors occurs.

BRIEF DESCRIPTION OF THE INVENTION

According to the invention the transmission bridge is characterized in that the transmission bridge comprises two identical a.c. circuits having complementary output stages, these circuits having a high input impedance and a low output impedance, the output signal of which is substantially identical to the input signal, a first input of each a.c. circuit being connected to an associated terminal and an output of each circuit being connected to that end of the associated supply resistor not connected to the terminal.

It should here be noted that such an a.c. circuit having a high input impedance and a low output impedance, the output signal of which is substantially identical to the input signal and which comprises a complementary output stage is known per se from U.S. Pat. No. 4,007,335; however, the inputs are coupled to the two terminals and the outputs are connected to the two supply resistors.

The transmission bridge according to the invention has the advantage that it can be implemented wholly electronically while retaining its insensitivity to the polarity of the subscriber's line and that there are no differential mode signals across the supply resistors so that these signals need not be attenuated.

In accordance with a further embodiment according to the invention the transmission bridge is characterized in that a second input of each a.c. circuit is connected to the first input of the other a.c. circuit, the signals applied to each second input being applied to the output with a phase shift of 180° with respect to the signals applied to the first input.

This achieves in a very simple manner that common mode signals are attenuated by the supply resistors. An additional advantage of the measures according to the invention is that this bridge does not comprise an isolation transformer or concrete coils.

BRIEF DESCRIPTION OF THE DRAWING

The invention and its advantages will be further explained with reference to the embodiments shown in the drawing, corresponding components in the various Figures having been given the same reference numerals and wherein.

DESCRIPTION OF THE PREFERRED EMBODIMENTS

Figure 1:
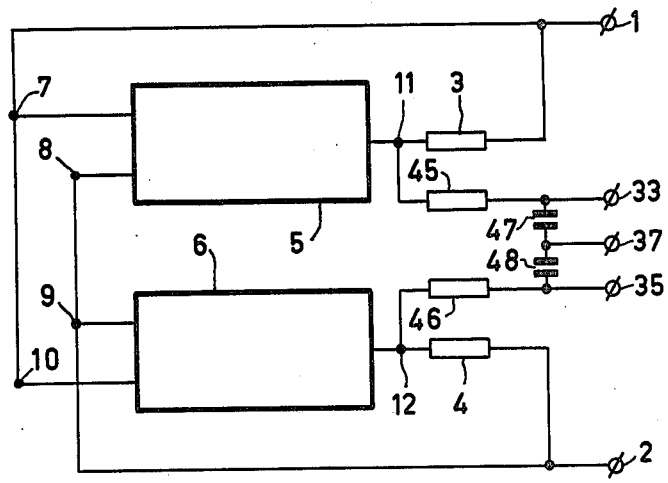
FIG. 1 shows a circuit diagram of a transmission bridge according to the invention.

The transmission bridge shown in FIG. 1 comprises two terminals 1 and 2 for the connection of the a and b wires of a subscriber's line. These wires are provided with the line current, prescribed by the administration, by means of a supply source, which is shown separately in FIG. 4, via the supply resistors 3 and 4.

To prevent the anti-phase voltage signals such as speech and ringing signals from being attenuated between the terminals 1 and 2 by these supply resistors, the transmission bridge is provided with two identical alternating current circuits 5 and 6 associated with terminals 1 and 2 respectively, each having a high input impedance, a low output impedance and a gain factor substantially equal to unity. Each of these alternating current circuits 5 and 6 has two inputs 7, 8 and 9 and 10, respectively, and an output 11 and 12, respectively, a first input 7 and 9, respectively, being connected to the associated terminals 1 and 2, respectively and the outputs 11 and 12, respectively, being connected to the associated supply resistor 3 and 4, respectively.

The operation of the circuit of FIG. 1 with respect to a.c. voltage signals between the terminals 1 and 2 operate as follows:

An a.c. voltage signal at the terminal 1 is applied directly to one end of the supply resistor 3 and to the other end of the supply resistor 3 by way of input 7, the alternating current circuit 5, and the output 11. Owing to the fact that the alternating current circuit 5 has a gain factor substantially equal to unity the same a.c. voltage is present on both sides of the supply resistor so that this a.c. voltage is not attenuated in supply resistor 3. The same holds for an a.c. voltage on terminal 2, which is applied directly to one end of the supply resistor 4 and, via first input 9, the associated alternating current circuit 6 and the output 12, to the other end of the supply resistor 4.

Owing to the high input impedances of the alternating current circuits 5 and 6, the a.c. voltage signals on terminals 1 and 2 are likewise not attenuated by the alternating current circuits 5 and 6 themselves.

The second input 8 or 10 of the alternating current circuit 5 or 6 is connected to its non-associated terminal 2 or 1 by the through-connection to the terminal of the first input 7 or 9 of the other alternating current circuit 6 or 5. Each alternating current circuit 5 or 6 is arranged so that the alternating current signal applied to the second input (8, 10) appears at the output (11, 12) in the opposite phase with respect to the signal applied to the first input (7,9). The operation thereof is as follows:

The alternating current signals at the terminals 1 and 2 consist of an anti-phase signal component such as speech and ringing signals and an in-phase signal component such as the noise signals induced in the two wires of the subscriber's line. The in-phase signal component applied to the input terminals 7, 8 and 9, 10, respectively, will be eliminated because of the property of the alternating current circuit that the signals applied to the input terminals 8 and 10 appears at the output 11 in the opposite phase with respect to the signals applied to the input terminals 7 and 9.

Figure 2:
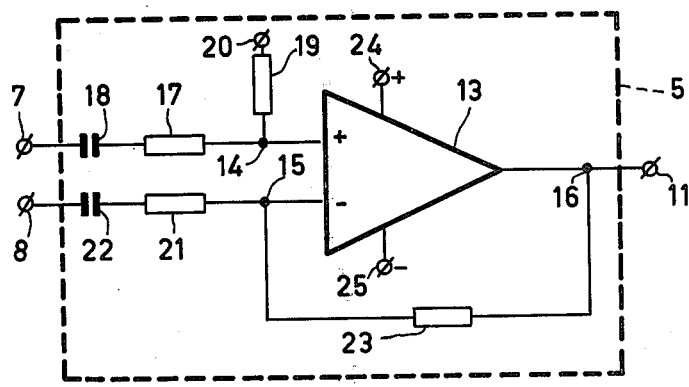
FIG. 2 shows an embodiment of an alternating current circuit for use in the transmission bridge shown in FIG. 1.

Owing to the low output impedance of the alternating current circuits 5 and 6 the in-phase signal voltages are applied in full across the supply resistors 3 and 4, causing the in-phas alternating current signal across the terminals 1 and 2 to be attenuated by the load of the supply resistors. However, differential voltage signals at the terminals 1 and 2 are applied by the alternating current circuits 5 and 6 to those ends of the resistors 3 and 4 which are not connected to the terminals 1 and 2 and, as explained above, are not attenuated by the supply resistors 3 and 4. FIG. 2 shows an embodiment of an alternating current circuit 5 and 6, respectively, suitable for this purpose.

The alternating current circuit 5 shown in this Figure comprises a differential amplifier 13 having a high gain factor and comprising a non inverting signal input 14, a signal inverting input 15 and a signal output 16, the signal input 14 being connected to the first input 7 via a first series arrangement of a first resistor 17 and a first capacitor 18, and to a control terminal 20 via a second resistor 19, the inverse signal input 15 being connected to the second input 8 via a second series arrangement of a third resistor 21 and a second capacitor 22 and the signal output 16 being connected to the output 11 and, via a fourth resistor 23, fed back to the inverse signal input 15.

In addition, the differential amplifier 13 is connected to the supply terminals 24 and 25 of a supply source, not shown in this Figure.

The alternating current circuit operates as follows. An a.c. voltage signal, applied to input 7 is applied to the signal input terminal 14 via the capacitor 18, which blocks the direct current, and a first voltage divider formed by the resistors 17 and 19. Likewise, an a.c. voltage signal applied to the input 8 is applied to the inverse signal input via the capacitor 22, which blocks the direct current, and a voltage divider formed by the resistors 21 and 23. For equal signal voltages at the signal input 14 and the inverse signal input 15 the output voltage of the differential amplifier 13 is zero volt so that with equal division ratios of the voltage dividers 17, 19 and 21, 23 the in-phase component of an a.c. voltage signal at the inputs 7 and 8 is suppressed. For the anti-phase component of an a.c. voltage signal at the inputs 7 and 8 the voltage at input 7 is applied to signal input 14 via the capacitor 18 and the first voltage divider, and an amplified version thereof is applied to the output 11 via the amplifier 13. Via the second voltage divider 23, 21 this output signal is applied to the inverse signal input 15 where it must compensate for the anti-phase voltage of the input 8 applied via the capacitor 22 and the second voltage divider 21, 23 and make the voltage at this inverse signal input 15 equal to that at the signal input 14. The consequence thereof is that the value of the third resistor 21 should be twice the value of the fourth resistor 23. Since, as mentioned above, the two voltage dividers should have equal division ratios to suppress the in-phase signal component, the value of the first resistor 17 is twice the value of the second resistor 19.

Direct current reference voltages are applied to the control terminals 20 of the alternating current circuits 5 and 6 for the application of the line current, via the supply resistors 3 and 4, to the subscriber's line connected to the terminals 1 and 2. These reference voltages are supplied at the signal outputs 16, the current being produced by the supply source connected to the supply terminals 24 and 25 of the differential amplifiers. The reference voltages for the alternating current circuits 5 and 6 must be chosen in accordance with the line voltage stipulated by the administrations for the subscriber's lines. Reversing the supply potential is achieved by simply interchanging the reference voltages of the alternating current circuits 5 and 6.

Ringing with an increased supply voltage potential can also be effected in a simple manner by applying higher reference voltages, which are switched in the rhythm of the ringing signal frequency, to the control terminals 20.

Figure 3:
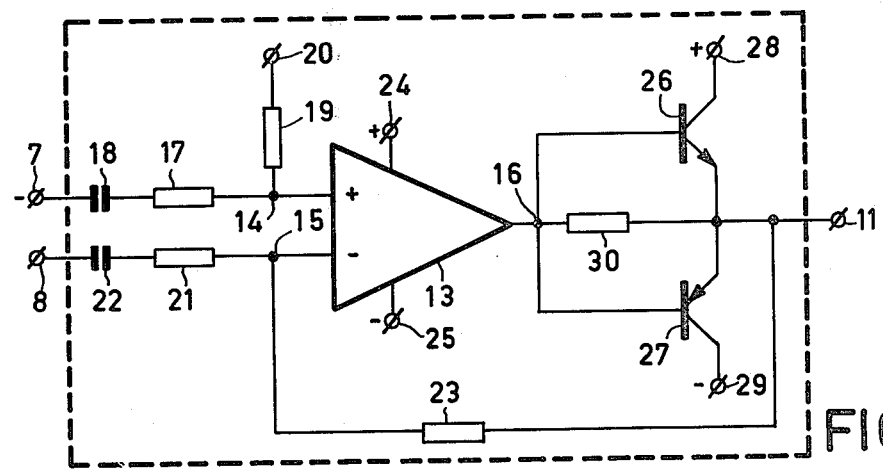
FIG. 3 shows an other embodiment of an alternating current circuit for use in the transmission bridge shown in FIG. 1.

As the normal commercially available differential amplifiers 13 (op.amps) cannot withstand such high voltages the alternating current circuits shown in FIG. 3 must be used.

The alternating current circuit shown in this Figure differs from the alternating current circuits shown in FIG. 2 in that a balanced amplifier stage comprising complementary emitter followers is added to the differential amplifier 13. This balanced stage comprises the complementary transistors 26 and 27 whose emitters are interconnected and connected to the output 11, whose bases are interconnected and connected to the high-impedance output of amplifier 13 and whose collectors are connected to associated terminals 28 and 29 of the supply source.

Figure 4:
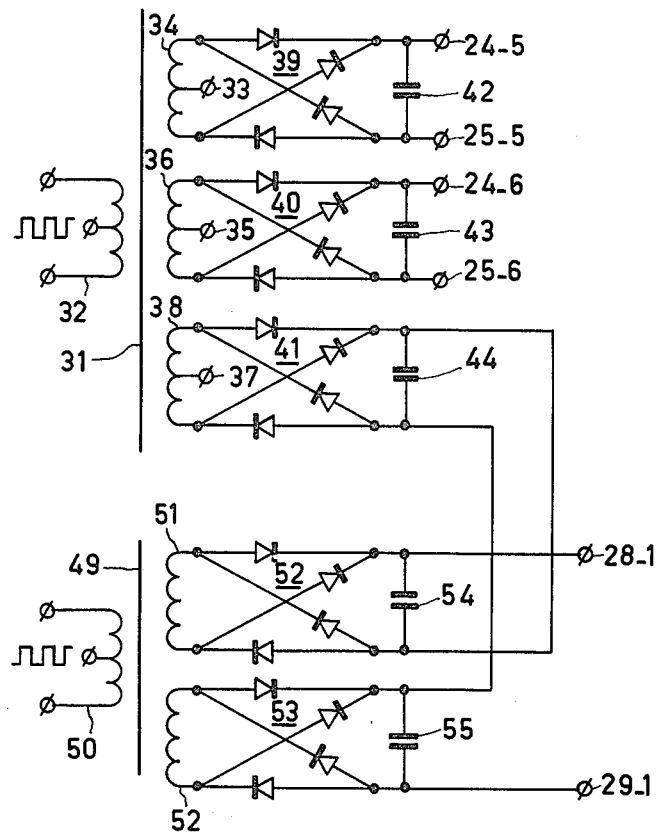
FIG. 4 shows a supply source for use in the transmission bridge according to the invention.

In dependence on the polarity of the high-impedance signal output 16 of amplifier 13 either transistor 26 or transistor 27 conducts, so that the supply current for a subscriber's line is obtained either from the terminal 28 or from the terminal 29 of the supply source. At the occurrence of a change in the polarity of the output voltage of the high-ohmic output 16 of the differential amplifier 13 neither transistor 26 or 27 will conduct in the voltage range from one base-emitter forward voltage above the line voltage level to a base-emitter forward voltage below the line voltage level. In order to reduce the resultant distortion of the signal at output 11, a resistor 30 is provided between the signal output 16 and the output 11. Commercially available integrated operational amplifiers may, for example, be used as the differential amplifiers. These differential amplifiers require supply voltages of a lower value than the line supply voltage. This has the drawback that, when the amplifiers are driven to a voltage equal to or greater than the line supply voltage and at the occurrence of large in-phase signal voltages on the subscriber's line, these operational amplifiers are changed to the supply voltages so that inter alia the in-phase, unwanted signals are converted into anti-phase signals, which are large, audible noise signals. This can be prevented by implementing the supply as a floating supply. FIG. 4 shows an embodiment thereof.

The supply circuit shown in this Figure comprises a first transformer 31 having a primary winding 32 and three secondary windings 34, 36 and 38, provided with centre taps 33, 35 and 37, with associated rectifier circuits 39, 40 and 41 and smoothing capacitors 42, 32 and 44. The supply terminals 24 and 25 of the differential amplifier 13 of the first and of the second alternating current circuits 5 and 6 are connected to the terminals 24-5, 25-5 and 24-6, 25-6, respectively, of the first and of the second, respectively, secondary winding 34 and 36, respectively.

The supply terminals 28 and 29 of the balanced amplifier stages of the alternating current circuits 5 and 6 are connected in parallel with the supply terminals 28-1 and 29-1 of the third secondary winding.

In order to have the supply voltages of the differential amplifiers 13 vary with the line voltage of the wires of a subscriber's line, connected to the terminals 1 and 2, the centre tap 33 of the secondary winding 34 is connected to output 11 via a resistor 45 (FIG. 1) and centre tap 35 of the secondary winding 36 is connected to the output 12 via a resistor 46. (FIG. 1).

The outputs 11 and 12 of the alternating current circuits 5 and 6, respectively, are connected to the centre tap 37 of the third secondary winding via resistor 45 and capacitor 47, and resistor 46 and capacitor 48, respectively.

Together with the capacitors these resistors constitute low-pass filters and have for their purpose to obtain a high stability for frequencies located above the speech band.

A second transformer 49 having a primary winding 50 and two secondary windings 50 and 51 with associated rectifier circuits 52 and 53 and smoothing capacitors 54 and 55 are provided for ringing with an increased supply voltage. The secondary windings 51 and 52 are arranged in series with the third secondary winding 38 of the first transformer 31 between the supply terminals 28-1 and 29-1.

By applying an a.c. voltage signal to the primary winding 50, the supply voltage between the terminals 28-1 and 29-1 is increased in a simple manner, which is a requirement for, for example, applying an increased voltage to a subscriber's line.

As described above the output voltage of the alternating current circuit varies with the input voltage. This renders it possible to apply to the circuits 5 and 6 not only the supply voltage to the line terminals 1 and 2 from the mains supply, but also to apply the a.c. voltage signals, such as speech signals, the 25 Hz ringing current and metering pulses.

Figure 5:
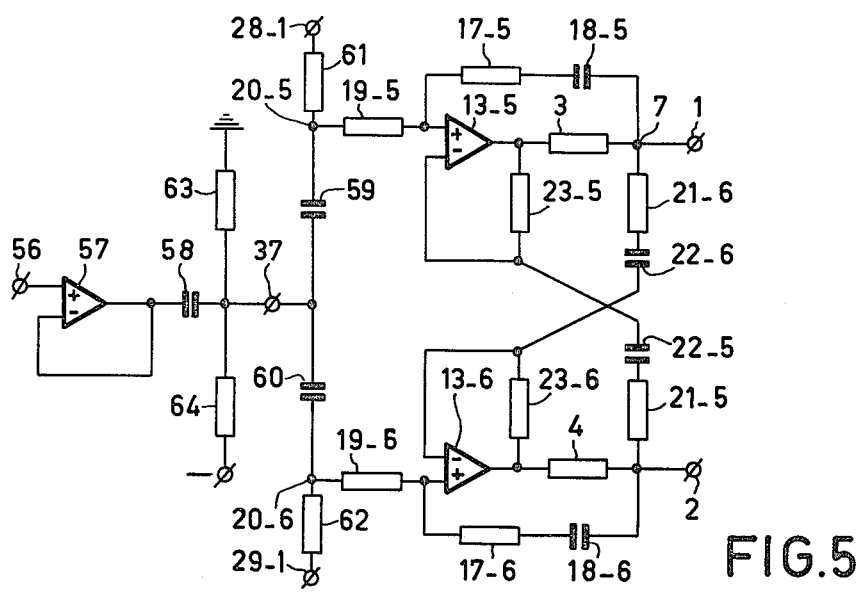
FIG. 5 shows a circuit for applying inphase control signals to the alternating current circuits.

To this end c.q. ringing signals are applied to the control terminals 20 of the alternating current circuits 5 and 6, causing them to appear thereafter at the terminals 1 and 2 in the manner described above. Said signals may be applied as analogs signals, or in the form of digital signals. This renders it possible to transmit signals, originating from a digital signal source, electrically isolated, to the transmission bridge for example by means of an optical coupler. The defined values of the binary signals causes that non-linear distortion of the optical couplers have no influence on the signal representation and cause a long life of the optical couplers by the possibility to adjust the operation voltage just below the highest of the two binary signal levels giving a low operation current. Thereafer, the digital signals are applied to the control terminals via a D/A converter. However, the use of delta modulated signals for the digital signals should be preferred. These delta modulated signals can be applied directly to the control terminals 20, owing to the integrating action of the resistors 17 and 19 in conjunction with capacitor 18. In-phase signals can be applied to the circuit via the centre tap 37 of the third secondary winding 38. FIG. 5 shows an embodiment wherein in-phase signals are also applied symmetrically to the control terminals 20.

In this Figure the components 13, 17, 18, . . . 23 of the alternating current circuits 5 and 6, respectively, are denoted by 13-5, 17-5, 18-5, . . . 23-5, and 13-6, 17-6, 18-6, . . . 23-6, respectively.

Via an input terminal 56, a fedback differential amplifier 57, and a D.C. isolation capacitor 58 the in-phase signal to be applied to the control terminals 20-5 and 20-6 is applied to control terminal 20-5 via a capacitor 59 and to the control terminal 20-6 via capacitor 60, so that an identical control of both control terminals is obtained. The required d.c. voltage signal is applied via resistors 61 and 62, arranged between the connecting terminals 28-1 and 29-1 of the third secondary winding 38 (FIG. 4) and the control terminals 20-5 and 20-6, the centre tap 37 being connected to the mutual junction of the capacitors 58, 59 and 60. To prevent diodes of the rectifier circuits 41, 52 and 53 (FIGS. 4 and 5) from being blocked the junction of the capacitors 58, 59 and 60 is connected to earth and to the negative pole of the supply source via very high-ohmic resistors 63 and 64.

Practical values and data, respectively, of the resistors and capacitors and suitable transistors, respectively, shown in the embodiments are $R_{17} = R_{21} = 200$ K$\Omega$ $R_{19} = R_{23}$ 100 k$\Omega$ $R_3 = R_4 = 50$ K$\Omega$, $R_{30} = 1$ K$\Omega$, $R_{63}$ and $R_{64} = 100$ K$\Omega$, $C_{18} = 0.1$ $\mu$F and $C_{22} = 0.99$ $\mu$F $T_{26} = $ BFQ 38 and $T_{27} = $ BFT 44, a TDA 1034 type amplifier being used as the differential amplifier.

The symmetry of the transmission bridge depends on the tolerances of the supply resistors 3 and 4. In view of the required symmetry, these resistors, which must limit the short-circuiting current occurring as the result of a short-circuit of a subscriber's line connected to the terminals 1 and 2, must be accurate within 1 o/oo and each resistor must have a value required by the administrations for limiting the short-circuit current, for example 400 ohms. This can be obtained in a very simple manner by including a coil having a suitable inductance between the third secondary winding 38 of transformer 31 and the rectifier circuit 41. The impedance produced by this coil for the a.c. voltage induced in the third secondary winding 38, for example a square-wave voltage, will limit the supply current in the case of a short-circuit on the subscriber's line to the required value and ensures a high degree of symmetry as, by means of the rectifier circuit 41, this impedance will be present in an identical mannner in the positive supply voltage circuit as well as in the negative supply voltage circuit.

What is claimed is:

1. A transmission bridge for a subscriber's circuit comprising:

two input terminals for the connection to a subscriber's line, two supply resistors each connected on one side to a respective one of said input terminals, a supply source which is coupled in a polarity independent manner to the opposite sides of each of said supply resistors, and two identical alternating current circuits each connected to a respective one of said input terminals and supply resistors and having complimentary output stages, said alternating current circuits having a high input impedance and a low output impedance and whose output signal is substantially identical to the input signal at the associated input terminal, a first input of each alternating current circuit being connected to the respective associated input terminal, and the output of each alternating current circuit being connected to said opposite side of said associated supply resistor which is not connected to the associated input terminal side.

2. A transmission bridge as claimed in claim 1, wherein a second input of each alternating current circuit is connected to the first input of the other alternating current circuit, the signals applied to each second input of each circuit appearing at said output with a phase shift of 180° with respect to the signals applied to the first input.

3. A transmission bridge as claimed in claim 2, wherein the alternating current circuits comprise high-gain differential amplifiers having a non-inverting signal input, an inverting signal input and a signal output, the non-inverting signal input being connected in each alternating current circuit to the first input via a first series arrangement of a first resistor and a first capacitor and to a control terminal via a second resistor, the inverting signal input being connected to the second input via a second series arrangement of a third resistor and a second capacitor and to the output of the alternating current circuit via a fourth resistor, the signal output being coupled to the output of the alternating current circuit.

4. A transmission bridge as claimed in claim 3, wherein the value of the first resistor is twice that of the second resistor and the value of the third resistor is twice that of the fourth resistor two to one.

5. A transmission bridge as claimed in claim 3, wherein the complementary transistors provided for each alternating current circuit have their bases, interconnected and connected to the signal output, the emitters being interconnected and connected to the output of the alternating current circuit and also connected to the bases via a resistor, the collector being connected to respective terminals of the supply source.

6. A transmission bridge as claimed in claim 3 or 5, wherein the supply source comprises an a.c. voltage source connected to a primary winding of a supply transformer having a first, a second and a third secondary winding, each provided with a centre tap, each winding being connected to a respective individual rectifier circuit having a smoothing device, output terminals of the smoothing device associated with the third secondary winding being the above-mentioned supply source terminals, and the centre tap of this third secondary winding being coupled to the outputs of the alternating current circuits and that output terminals of the smoothing devices associated with the first and the second secondary windings produce supply voltages for the differential amplifiers of the respective alternating current circuits and the centre taps of the first and the secondary winding are coupled to the respective outputs of the alternating current circuits.

7. A transmission bridge as claimed in claim 6, wherein the outputs of each alternating current circuit are connected to the centre tap of the associated secondary winding via a resistor and the centre taps of these windings are connected to the centre tap of the third secondary winding via capacitors, the resistors and capacitors constituting filters to increase the stability for frequencies above the speech band.

8. A transmission bridge as claimed in claim 6, wherein an inductance is included between the third secondary winding and the smoothing device added thereto for the purpose of limiting the supply current in case of a short-circuit of a subscriber's line connected to the terminals.

* * * * *